United States Patent [19]

Flowers et al.

[11] Patent Number: 5,038,142
[45] Date of Patent: Aug. 6, 1991

[54] TOUCH SENSING DISPLAY SCREEN APPARATUS

[75] Inventors: Dale R. Flowers, Atlanta, Ga.; Pat Gallarelli, Chapel Hill, N.C.; Kevin P. Goffinet, Cary, N.C., Anthony W. Miles, Raleigh, N.C.; Charles A. Rudisill, Apex, N.C.; Kevin H. Vorhees, Raleigh, N.C.

[73] Assignee: International Business Machines Corporation, Armonk, N.Y.

[21] Appl. No.: 324,777

[22] Filed: Mar. 14, 1989

[51] Int. Cl.$^5$ ............................................. H03K 17/94
[52] U.S. Cl. ........................................ 341/34; 178/18; 340/706
[58] Field of Search .................... 340/711, 712, 706; 341/34, 20; 73/1 B, 862.03, 862.04, 862.65; 178/18-20; 177/229, 211

[56] References Cited

U.S. PATENT DOCUMENTS

| | | | |
|---|---|---|---|
| 4,550,384 | 10/1985 | Kimura | 178/18 |
| 4,558,757 | 12/1985 | Mori et al. | 177/211 |
| 4,675,569 | 6/1987 | Bowman et al. | 340/712 |
| 4,800,973 | 1/1989 | Angel | 73/862.65 |

OTHER PUBLICATIONS

"Tap Screen Mounting System"; IBM Tech. Dislc. Bulletin, vol. 28, No. 4, Sep. 1985.

*Primary Examiner*—Ulysses Weldon
*Attorney, Agent, or Firm*—Edward H. Dufield

[57] ABSTRACT

A touch sensing direct input data display device is described. The data display screen is directly and solely supported within a housing by stiff springs having essentially uniaxial freedom of motion. Strain gauge sensors are applied directly to the springs and are connected in a full Wheatstone bridge sensing circuit. The outputs of the sensors are fed to a calculating and processing device for calculating the X, Y and Z coordinate information relative to the point on the face of the display which has been pushed or touched. The Z component is of total force and the X any Y components give the two dimensional location for the application of the force measured in the Z axis. The stiff springs allow very little deflection to occur under normal touch imposed forces on the display screen. They permit essentially uniaxial motion only in the Z axis. The system is mechanically robust and may be shipped and subjected to dropping or impact loads normally encountered in shipping without damage, has a relatively high natural frequency of vibration and produces high level, relatively continuous output signals for use.

12 Claims, 5 Drawing Sheets

FIG. 3D $$\text{STRESS} = \frac{M(t/2)}{I}$$

TOUCH SENSING DISPLAY SCREEN APPARATUS

FIELD OF THE INVENTION

This invention relates to position indicating data input touch systems and position dependent force measuring systems such as are employed in touch sensitive tablet and position locating systems in general. It specifically relates to touch activated electro-optical data display and input apparatus of the type generally known as a "touchscreen".

RELATED APPLICATION

This application is related to a copending, commonly-assigned application Ser. No. 07/324,778 now U.S. Pat. No. 4,918,262 filed concurrently herewith which deals with features of the electronic calculating and processing system employed with the apparatus of this application

PRIOR ART

A wide variety of touch input or position indicating or locating force measuring tablet or screen input systems have previously been devised. See for example U.S. Pat. No. 3,657,475 to Peronneau et al which discloses a typical system for measuring force at the four corners of a rigid input tablet in response to application of pressure at some selected point on the tablet. The XY coordinates and the total Z axis force are calculated in an electronic processing unit utilizing well known principles of statics for calculating from the resultant forces measured by the sensors the locus of the XY force application point and the magnitude thereof.

See also U.S. Pat. No. 4,121,049 to Roeber which discloses, in a manner similar to Perroneau et al, a touch input tablet for providing XY resultant locus of force measurement and calculation of Z axis total force information as part of a data input system to an analog or digital computer which may also be utilized with a display device or position control system or to interact with an XY readout such as cathode ray tube or the like.

U.S. Pat. No. 4,389,711 to Hotta et al is also directed to systems of this type and specifically describes a variety of hysteresis techniques for accurately determining and accounting for offset errors in touch sensitive tablet data input or force detection systems.

U.S. Pat. No. 4,550,384 to Kimura is also relevant to touch tablet input systems and shows the use of integrally formed sensor arms as a part of the tablet.

U.S. Pat. No. 4,340,777 to DeCosta et al discloses a unique mounting and force application system for providing moment-free unidirectional force to sensors utilized in a touch input device as well as methods of sampling various sensors and determining when threshold levels of touch discrimination have been reached.

Finally, U.S. Pat. No. 4,355,202 to DeCosta et al shows various applications of the moment-free force input sensor structure of U.S. Pat. No. 4,340,777 in a system which directly employs a CRT or other data display apparatus as the touch tablet or screen.

A problem with each of these prior art devices is that the force sensor elements either provide directly a support for a rigid tablet or are forced to provide support for the display device itself. This means that not only must the sensor elements themselves be very robust in order to withstand the forces of use and transportation, but they also must be highly sensitive in order to accurately discriminate small fluctuations of force as imposed by a human operator touching a display tablet or input device. These are conflicting requirements that are difficult to achieve. Only Kimura appears to have avoided the problem, but in a manner unsuited to application to display screens of electro-optical systems and useful only as a tablet.

The problem of providing a high sensitivity, relatively high electrical signal output sensor system that is mechanically and physically robust enough to withstand normal transportation and use without employing cumbersome and expensive mechanical structures and/or shipping containers is a significant one. In most of the known prior art, the weight and mass of the display or tablet system is borne directly on the sensors that provide the electrical outputs. The sensors themselves are generally highly sensitive and are often fragile or subject to strain failures.

OBJECTS OF THE INVENTION

In light of the foregoing shortcomings of the known prior art, it is an object of this invention to provide an improved touch sensing display and data input apparatus in which the display screen itself may be the touch surface but in which the force sensing elements do not directly bear the load incurred in supporting the mass of the display device while maintaining a high sensitivity, high output electrical signal.

Yet another object of the present invention is to provide an improved touch input display system of simple and robust structure which does not require extensive additional elements or parallax-inducing, vision-obstructing elements or panels.

BRIEF SUMMARY OF THE INVENTION

The foregoing, and still other objects that have not been specifically enumerated are met in a preferred embodiment of the present invention as is described further herein. Briefly, in the current invention, any desired electro-optical display such as a cathode ray tube (CRT), a cold plasma display screen, a liquid crystal display (LCD), light emitting diode displays (LEDs), electroluminescent panels, incandescent or neon bulb panels or any similar "electro-optic" display device is supported directly upon a plurality of beam springs. The beam springs are preferably double cantilever mounted to provide essentially only a single degree of freedom in bending in a plane perpendicular to the long axis of the beam. In the preferred embodiment, flat leaf springs are clamp mounted at both ends in cantilever fashion. One end of each leaf spring is rigidly affixed to a mounting point serving as mechanical ground in the frame or housing of the display device and the other end of each spring is rigidly affixed to the display screen itself or to a frame which is affixed to the display screen itself. The springs thereby provide the sole physical support for the mass of the display screen. The dimensions of each leaf spring are chosen so as to provide for deflection in essentially a single axis of bending that is arranged to lie along an axis generally perpendicular to to the surface of the display screen itself. In the preferred embodiment, a CRT is supported at its four corners by the cantilever mounted beam springs which bear the entire weight of the CRT display. Forces imposed by touching the surface of the CRT are measured by strain gauges affixed to the flat surfaces of the beam springs which are stressed in response to forces applied to the surface of the CRT display.

BRIEF DESCRIPTION OF DRAWINGS

The invention will be described with respect to a preferred embodiment thereof in which:

FIG. 3 consisting of FIGS. 3A through 3D illustrates the principles of a double cantilever mounted flat beam or leaf spring with implemented strain gauge sensors according to the preferred embodiment.

DETAILED DESCRIPTION OF INVENTION

As noted earlier, numerous prior art systems for calculating the XY locus or position of a touch input to a display panel, force input panel or even to a display device are known. However, the task of building a robust, high sensitivity input for a display screen touch sensing system has proved difficult. In the present invention, the problems are solved by directly supporting the entire mass of the display screen or display element itself on springs. The springs are made relatively stiff and are so mounted as to provide essentially unidirectional or uniaxial freedom of motion only. The stiffness of the springs limits the excursion of the supported display device to a single axis over very small latitude which makes the assembly robust enough for withstanding stresses of use and physical shipment of the assembly. High output sensitivity is maintained despite the very small deflections of the system by providing high sensitivity foil or semiconductive strain gauges bonded securely to the supporting springs in the assembly. The springs themselves are preferably flat leaf or beam springs mounted in double cantilever fashion, i.e. both ends securely mounted and clamped to provide bending stresses only in responses to deflections of the supported element. The strain gauges are placed relative to the inflection of an S-shaped bend in the spring to put some gauges in tension and some others in compression. By appropriate placement and connection of the gauges into a Wheatstone bridge measurement circuit, high electrical output may be obtained from very small physical strains imposed in the cantilever springs. The springs may be made relatively wide in the axis transverse to the bending axis so that side deflections or loads imposed upon the supported display screen are strongly resisted and little or no deflection occurs in any axis other than the axis generally perpendicular to the surface of the display screen. This is a uniaxial freedom of movement or unidirectional freedom of movement supporting system. Removing the strain gauges or force sensing elements from the role of having to directly support the mass and weight of the screen or touch tablet greatly alleviates the potential of damages from stresses applied to these sensitive elements.

Figure 1:
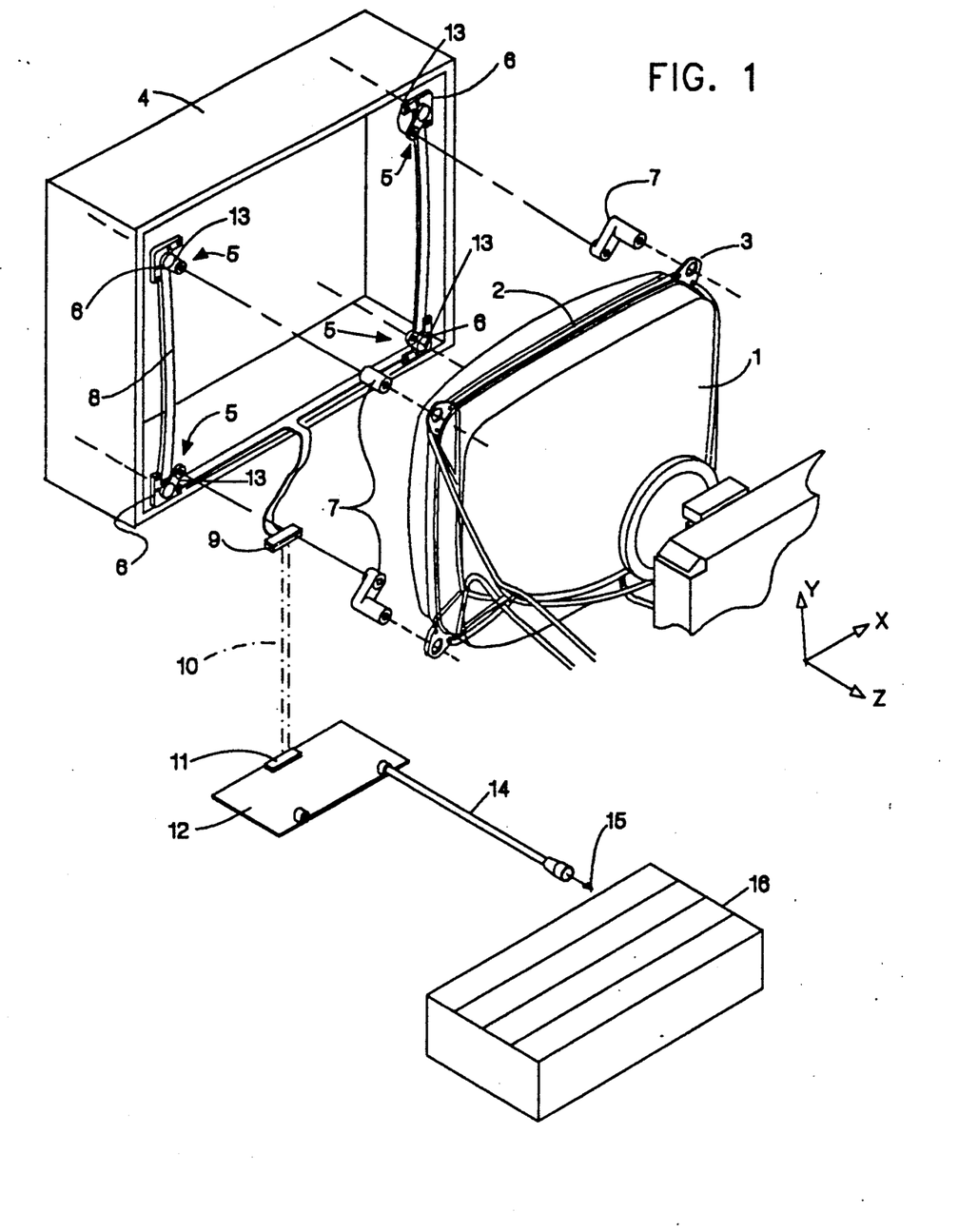
FIG. 1 represents a simplified exploded assembly of the major components of the touch sensing display screen apparatus.

Turning to FIG. 1, an exploded view of the major components of a touch sensitive input display screen apparatus according to the preferred embodiment of the invention is shown. In FIG. 1, a CRT 1 is chosen as the representative electro-optical display screen or device, but it will be understood that any electro-optical display device such as LCDs, LEDs, electroluminescent display, flat panel plasma displays or even incandescent or fluorescent displays, gas discharge displays or any of the like are generally encompassed by the term "electro-optical" display.

CRTs are the most commonly employed electro-optical device today, particularly in applications involving the use of interactive user application programs on computer systems. Consequently, the preferred embodiment is illustrated utilizing a CRT that will be employed with a computer system monitor display. The CRT 1, is normally supplied with a stout metal band 2 incorporating mounting tabs or ears 3 with which the CRT is normally firmly affixed inside a bezel 4 or to a mounting framework in the chassis of a CRT display monitor and/or its housing (not shown).

In the present invention, four beam springs 5 are tightly affixed to clamping plate or mounting surface elements 6 in the bezel 4. The springs 5 are thus cantilever mounted and are rigidly held by the mounting element 6 at one end of each spring 5. The other end of each spring 5 is connected either directly to the mounting tab or ears 3, or to an intermediate adjustable clamp 7 which permits adjustment relative to the springs 5. This adjustment permits the display 1 to be oriented with its surface coplanar to the front of the bezel 4 and to account for any slight mechanical construction variance tolerances in the placement of the locating ears or mounting tabs 3, the mounting plate 6 and the spring elements 5.

It will be seen that each end of each spring 5 is thus rigidly clamped in a supporting structure upon assembly. In the structure depicted in FIG. 1, flexure of the beam springs 5 mounted in their cantilever fashion is primarily limited to the Z axis direction. Flexure is in response to any forces applied in the XY plane on the surface of the CRT 1.

Flexible cables 8 are terminated in a connector 9 which may be supplied, optionally, with a cable 10 for connection remotely to another connector 11 mounted on an electrical calculator processor card 12 that carries out the X,Y and Z resultant force locus calculations and total force summations from the signals supplied to it. The processor or calculation card may preferably be a microprocessor of a commercially available type such as the Intel Corporation's 80C196 Microcontroller which advantageously incorporates a 10 bit A to D converter on it together with other appropriate circuitry as will be described in greater detail later.

Strain gauges 13 are mounted on each spring 5 and connected via cable 8 and connector 9/11 to the calculating processor card 12 for supplying the electrical input signals thereto. Preferably, the strain gauges 13 are connected in a full four-way Wheatstone bridge at each spring 5, i.e. four individual strain gauges may be employed on each spring 5 as will be described in greater detail later.

The X, Y and Z calculating microprocessor 12 supplies its output in the form of electrical signals representing the locus of the application of force to the surface of the screen of the display device 1 and the magnitude of the force in the Z axis. These outputs are clocked at high speed to provide signals essentially continuously via output cable 14 to the input port 15 of the system computer 16. There the XY position data and the Z axis total force information from the processor 12 may be utilized in a variety of interactive application programs as is apparent to those of skill in this art. The applications for the X, Y and Z input data resulting from the output of the calculating processor 12 are amply described in the aforementioned patents listed under the prior art section hereof and need no further description to those of skill in this field.

Figure 2:
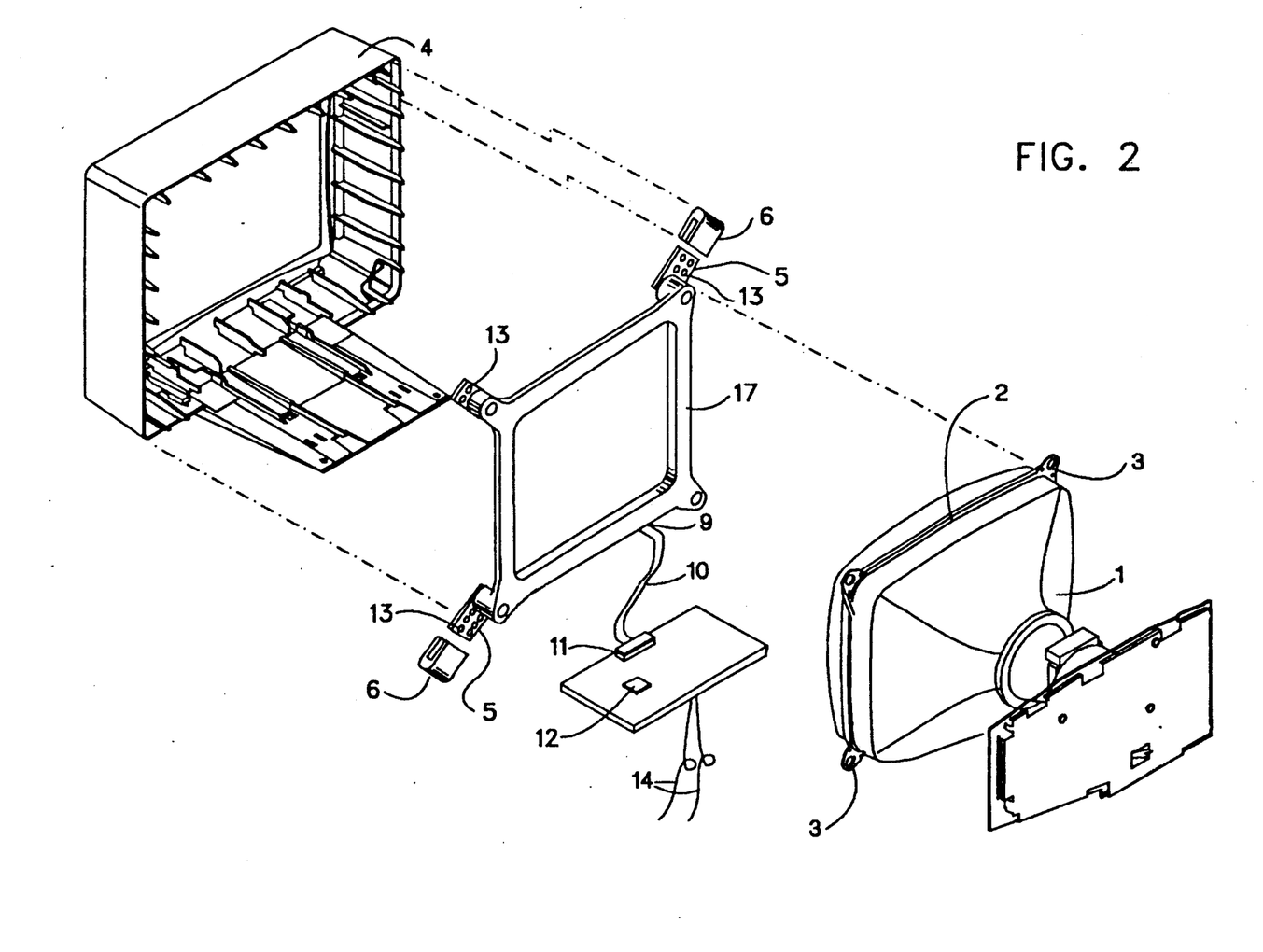
FIG. 2 illustrates an exploded view of a modification of the support structure for a CRT as used in the preferred embodiment.

Turning to FIG. 2, an exploded view of a somewhat more detailed form of an alternative embodiment of the preferred invention mechanical structure is shown. This alternative embodiment incorporates a rigid separate frame 17. Frame 17 incorporates the spring mounting and clamping arrangement for one end of each spring 5 as shown by element 7 which, in this case is integrally made with frame 17. The frame 17 is attached to the mounting ears or lugs 3 which are part of the CRT 1's usual mechanical support elements as previously noted. The other elements are similarly numbered to those same elements as shown in FIG. 1 and are not discussed further with respect to this drawing.

Turning to FIG. 3, comprising FIGS. 3A through 3D, a more detailed explanation of the use of the double cantilever mounted beam spring elements 5 depicted in FIGS. 1 and 2 will be given.

Figure 3A:
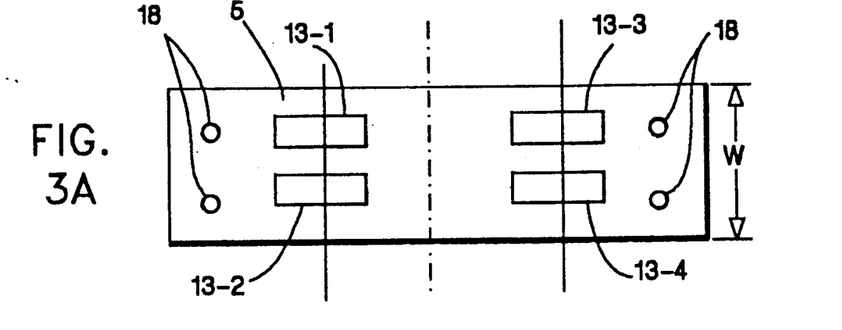

In FIG. 3A, a plan view of a generally flat leaf spring 5 is shown. Leaf spring 5 in the preferred embodiment may be formed of heat treated 17-7 PH stainless steel having approximately 190,000 psi minimum yield strength. The typical dimensions found advantageous in a preferred embodiment for leaf spring 5 are length L of 0.972 inches, a width W of 0.550 inches and a thickness T of 0.032 inches. Mounting holes 18 are drilled, stamped or etched in each end of the spring 5 as shown in FIG. 3A and four strain gauges 13-1 through 13-4 are firmly bonded with the usual strain gauge bonding agent to the surface of spring 5. The gauges are roughly equidistant from the center line/inflection point of bending as shown by the dotted line through the center of spring 5 in its depictions in FIGS. 3A through 3D.

The strain gauges 13-1 through 13-4 are the commercially available constantan foil type gauges having a gauge factor Gf of approximately $$2\left(\frac{\Delta R/R}{\epsilon}\right)$$

and a nominal resistance of 1200 ohms, where $\epsilon$ is the unit of strain and R is resistance in ohms. As implemented on the springs in the preferred embodiment, these gauges yield approximately a millivolt per pound of force as a signal output with a 10 volt DC input when implemented in a full four way Wheatstone bridge.

Figure 3B:
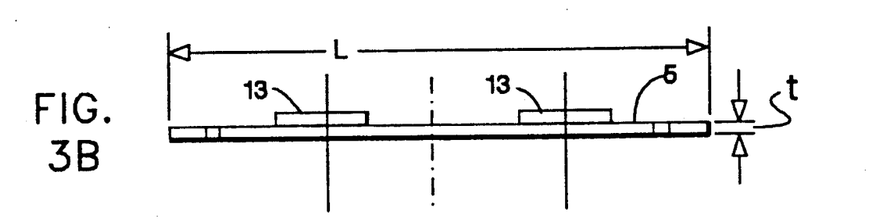

FIG. 3B illustrates the horizontal cross section of beam spring 5 and the placement of the strain gauges 13 on its surface.

Figure 3C:
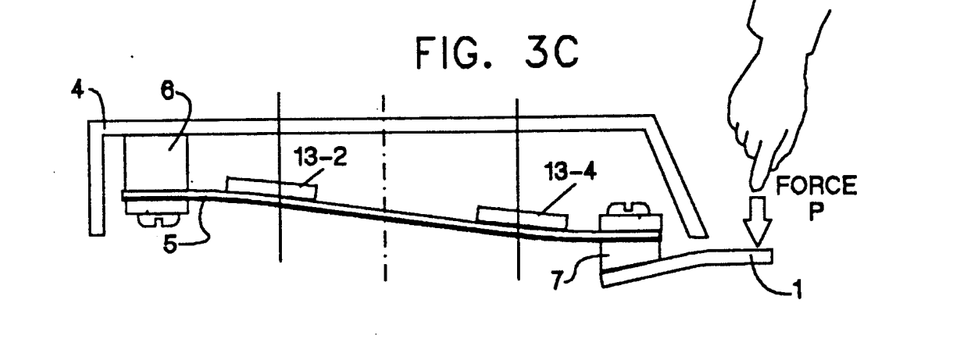

FIG. 3C illustrates a beam spring 5 mounted in double cantilever fashion between mounts 6 and 7 and under strain imposed by finger pressure applied to a display surface 1 so that spring 5 is deflected in bending into an approximate capital S shape. This has been shown highly exaggerated in FIG. 3C in order to illustrate the fact that gauges 13-1 and 13-2 will be placed in tension while gauges 13-3 and 13-4 will be placed in compression. Gauges 13-1 and 13-2 will be connected in diagonally opposite legs of the full Wheatstone bridge arrangement and gauges 13-3 and 13-4 are connected in the other two diagonally opposed legs as will be well understood by those of skill in the art. Utilizing four strain gauges with two being in compression and two being in extension provides twice the electrical output signal as would be provided by a single pair of gauges.

Figure 3D:
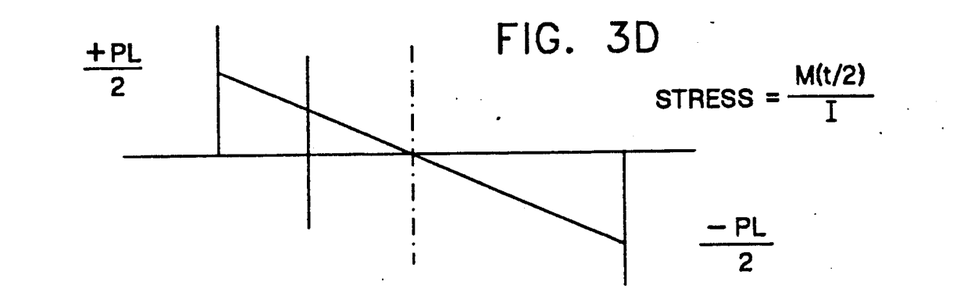

FIG. 3D is the resultant stress diagram of the spring 5 when it is cantilever mounted as shown. It clarifies the point that two of the gauges are located so as to experience tensile strain while those of its compliment experience compressive strain.

The dimensions and material selected for springs 5 yield a stiffness of 4,181 pounds per inch for each spring 5 when mounted as shown. For a CRT 1 having four springs 5, the total stiffness is 16,724 pounds of force per inch of deflection, approximately, when a rigid frame is utilized to eliminate torsional moments at the end of springs 5 adjacent to the CRT 1. At the center of screen of CRT 1, a force of four pounds will produce a deflection of approximately two ten thousandths of an inch. The details of calculating and processing circuitry and processes contemplated therein are the subject of a simultaneously filed and commonly assigned copending patent application Ser. No. 07/324,778 and will be discussed no more herein inasmuch as these aspects do not form a part of the presently claimed invention.

Figure 4:
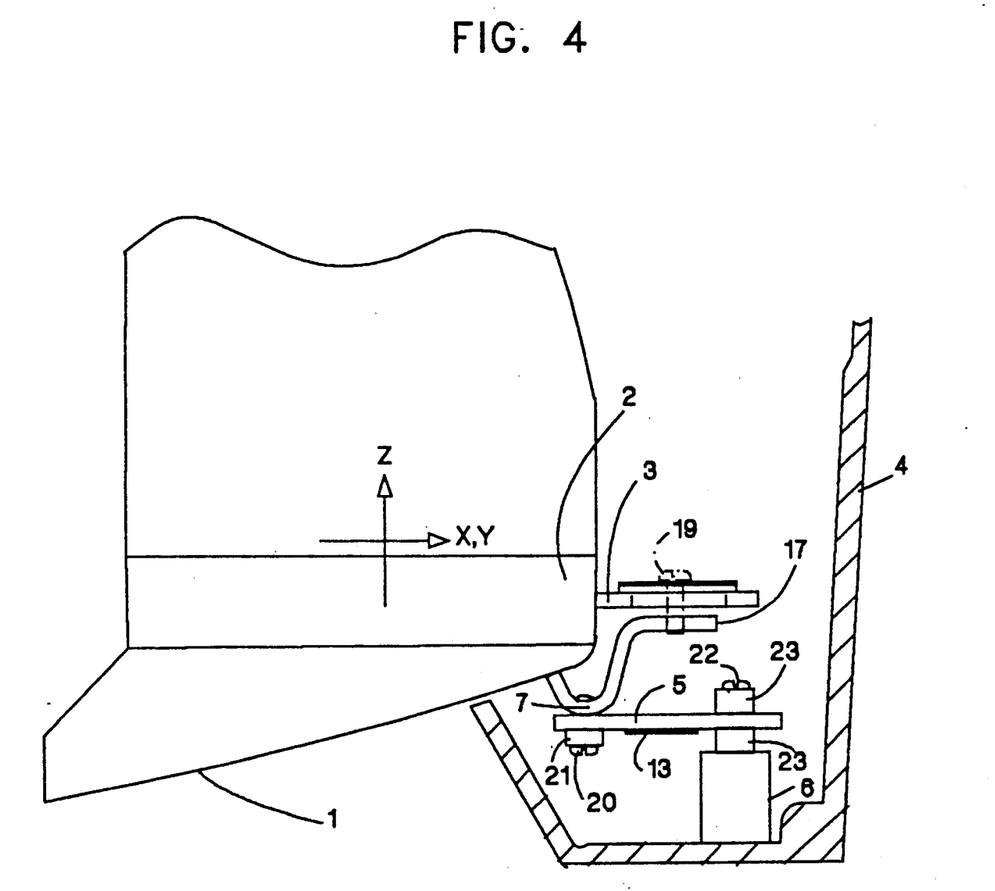
FIG. 4 illustrates a partial detailed cross-section of a single beam spring support and strain gauge mounted to a mounting frame for an assembly of the type illustrated in FIG. 2.

In FIG. 4, it will be observed that the CRT 1 is solely supported by its integral band 2 and mounting lugs 3 to a rigid framework 17 which has integrally made into it the mounting clamp 7 for one end of each spring 5. A screw or other suitable fastening means 19 secures the mounting lug 3 to the framework 17 that substantially eliminates any torsional moments from being applied to spring 5. A rigid mounting clamp comprising element 7 and screw 20 with a washer or a spacer 21 is also employed. Clamp 6 comprises a screw 22 and washers or clamp members 23 as shown. Strain gauges 13 are shown without the electrical connecting leads which are well known in the art. The housing or bezel 4 for the CRT is seen not to actually be in physical contact with the CRT 1. Hence it will be observed that the entire weight or mass of the cathode ray tube 1 (or any equivalent electro-optical display device) is, in accordance with the present invention, fully floatingly supported by the beam springs 5.

As has been pointed out with regard to FIG. 3, and as has been mentioned earlier, springs 5 are configured to exhibit essentially only a single degree of freedom in bending. The lateral width of each spring 5 is chosen to be relatively great as compared to its thickness to resist any substantial transverse axial forces either horizontally or longitudinally. Thus spring 5 is essentially free to bend only in the axis perpendicular to its own longitudinal axis and parallel with the Z axis of orientation of the display screen 1.

With a typical 14" CRT display weighing approximately 16 pounds, and given the typical preferred dimensions and preferred material for the springs 5 and their double cantilever mounting arrangements, a theoretical natural resonant frequency of the free floating CRT, beam spring and end mounting arrangement is approximately 100 hz. However, when this assembly is actually mounted in a bezel 4, the natural resonant frequency drops to approximately 10 hz due to the inherent flexibility of the plastic or metal bezel which allows some slight torsional and bending moment at the end where clamp 6 connects the bezel 4 to the spring 5. The torsional moment is primarily due to the flexing of the bezel 4 as will be apparent to those of skill in the art. Of course, the bezel 4 may be made of cast metal and made very stiff so that the theoretical resonant frequency of the assembly remains higher.

It will be appreciated, therefore, that a wide variety of length, width and thickness ratios and various materials may be employed for the springs 5 while maintaining them in an appropriate high strength or stiff, i.e. low compliance, configuration as is desired for providing a robust and physically strong assembly that can withstand the rigors of use and shipment. For example, a spring having a stiffness of only about 40 pounds per inch would pass the requirement of having sufficient stiffness in the Z axis and would achieve a low natural frequency of vibration on the order of 10 hz. However, such a spring, if made of the same material as that earlier discussed would only need to be about four thousandths of an inch thick and such a spring would not have sufficient strength in its lateral direction of bending to provide a sufficiently robust design to withstand lateral and horizontal stresses out of the Z axis. Consequently, the figure of approximately 40 pounds per inch compliance of each spring 5 in double cantilever bending load configuration is approximately the least minimum stiffness that can be employed satisfactorily in the current design. As for an upper limit of spring stiffness, the choice of a semiconductor strain gauge instead of a foil type constantan gauge can produce much higher electrical output signals with even a very stiff beam spring design. Springs on the order of ten times the stiffness, i.e. only about one tenth the compliance, can thus easily be implemented utilizing such strain gauges without departing from the spirit and scope of the present invention. The suitable range of stiffness for springs 5 thus lies in the range of approximately 40 to 40,000 pounds per inch and conservatively in the range of 100 to 10,000 pounds per inch compliance.

Figure 5:
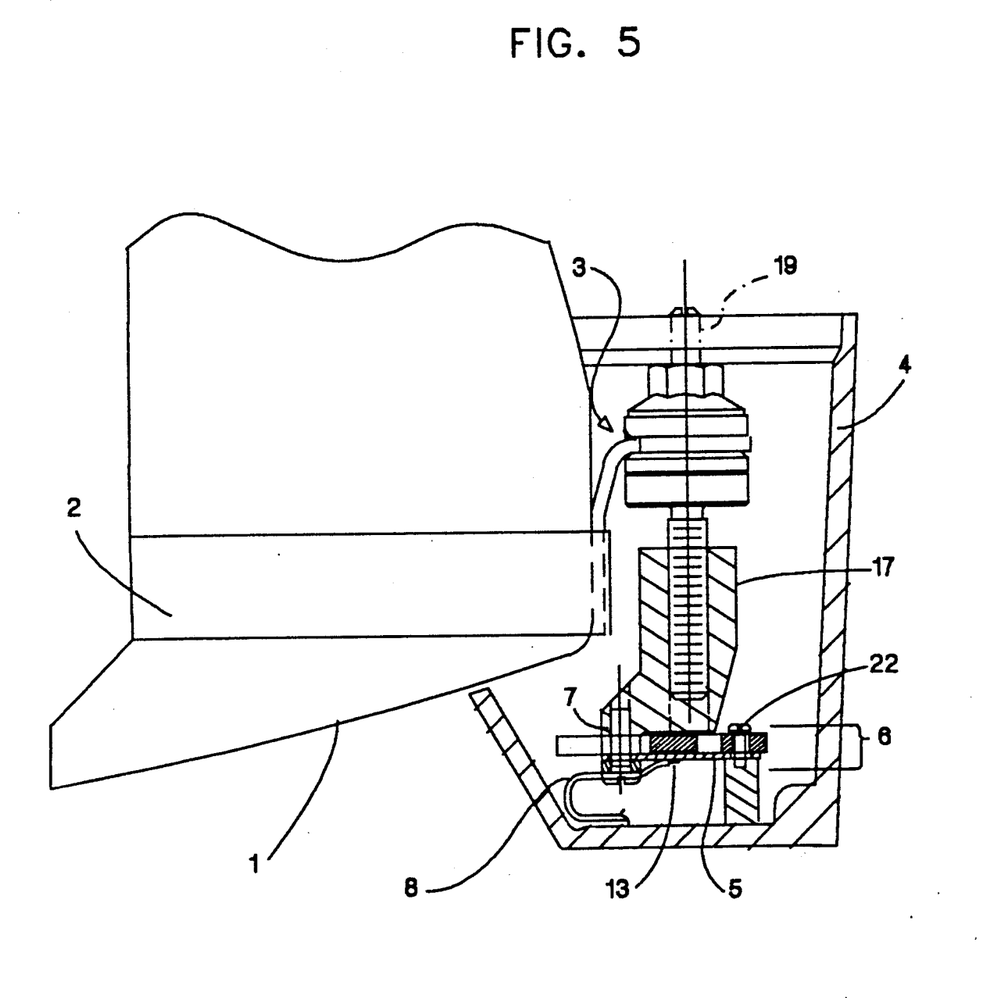
FIG. 5 illustrates an alternative adjustable mounting clamp and support for the display device.

FIG. 5 illustrates in some detail an enlarged corner section of an alternative mounting arrangement for the CRT display 1 within the bezel 4 utilizing the spring elements 5 as previously noted. In this arrangement, the stiff framework 17 has integral clamp portion 7 similar to those described with respect to FIG. 4. However, the screw element 19 which fastens the mounting ears 3 of the CRT to the frame 17 is outfitted with an adjusting nut so that the Z axis placement of the CRT 1 relative to the frame 17 may be slightly adjusted to account for any manufacturing tolerances or errors in the placement of the support clamps 6, the length of springs 5, mechanical differences in the thickness or dimension of clamps 7 and frame 17 or of the mounting lugs 3 and band 2 on the surface of the CRT 1. This enables alignment of the CRT 1 along the Z axis with equal load applied to all springs 5 when forces are imposed on the center of the display 1. Elements not specifically discussed herein are similarly numbered to those appearing in FIGS. 1 through 4 and are thus not discussed further.

INDUSTRIAL APPLICABILITY

As described with reference to the FIGS. 1 through 5 herein, the preferred embodiment of the invention is realized commercially in an embodiment utilizing a computer monitor-CRT as a user interactive touch surface input device. The surface of the CRT is directly touched and pushed by a human user to indicate selection of a displayed element on the face of the display. The forces imposed on the system due to the human touch on the CRT are monitored at each corner of the display via the sole support elements, the relatively thin beam springs 5 with appropriately mounted strain sensing elements 13 as discussed. The beam springs 5 are attached via clamping arrangements 6 and 7 at each end to provide cantilever mounting for the beams. One end of the beam 5 is thus mechanically constrained to move with the Z axis deflection of the CRT in response to application of pressure on its surface and the other end is constrained to be relatively immovable as it is attached to the monitored chassis or bezel 4. The beam springs 5 are designed to deflect only slightly or, to a human, imperceptibly when a force is applied to the screen of the display device. The beam spring material and physical dimensions as described herein are optimized to provide both adequate deflection to provide adequate signals under low touch input forces in the range of one pound while still providing adequate material fatigue and impact strength to withstand millions of flexures and to resist the stresses imposed by shipment, intentional attempts at overstress by vandals, and the like. Heat treatable steel is preferred for the springs 5 since such materials exhibit a relatively constant elastic modulus that is needed for providing transducer linearity and consequent signal linearity in the output from the strain gauges. The width and thickness of each beam spring are also advantageously optimized to decrease force sensitivity in the X or Y directions and to provide a strong and secure mounting of the CRT or display screen within its chassis or bezel.

Allowing the CRT or display device to be floatingly mounted on the beam springs 5 alone does increase the vibration susceptibility of the system since the mass of the CRT is relatively high. It follows that stiff springs must be employed in order to keep excursions in the Z axis low (and the natural resonant frequency high) in response to vibration forces and accelerations commonly present in today's environment.

Having thus described our invention with reference to several preferred embodiments and modifications thereof it will be apparent to those of skill in this art not only that a wide variety of electro-optical display devices may be utilized in place of the illustrated CRT, but that numerous departures in the cantilever beam spring material selection and physical design may be made without departing from the spirit and scope of the invention. For example, a momentless pivot mount at one end or the other of the beam spring (making it a singly cantilever mounted spring) might be envisioned and, although additional costs might be encountered, would not significantly detract from the operation since it would still be possible to place the cantilever beam in bending via forces applied to the surface of the display. To that end, either end of the beam spring 5 might be pivotally or moment-free mounted. However, in the present embodiment, it has been found desirable and advantageous to firmly mount both ends of each beam spring 5. Nevertheless similar mechanical departures may be envisioned without departing from the spirit of the invention in which the display device is solely supported for essentially uniaxial movement by the beam springs themselves and in which the strain gauge sensor elements do not bear the load but monitor the loads being borne by the springs.

Therefore, what is described in the claims which follow is intended by way of illustration and not by way of limitation and what is desired to be protected by letters of patent is set forth in the claims as follows:

We claim:

1. Touch sensing display apparatus, comprising in combination:
   a display means for visibly manifesting data on a surface thereof; and
   a computer system electrically connected to said display means for controlling the manifesting of data on said display means; and
   a frame means; and
   a plurality of spring elements connected to said frame means and to said display means, said spring elements being the sole support for said display means; and
   a plurality of strain sensor means associated with said spring elements, said sensor means providing electrical output signals in response to strains imposed in said spring elements by relative movement between said display means and said frame means; and
   electrical signal calculating means connected to receive said electrical signals from said plurality of strain sensor means, said calculating means calculating from said signals the locus and magnitude of singular forces imposed on said display means, said calculating means being connected to said computer system for providing results of its calculations thereto.

2. Apparatus as described in claim 1, wherein:
   said spring elements provide substantially only a single degree of freedom of relative movement between said display means and said frame along an axis generally perpendicular to the surface of said display means.

3. Apparatus as described in claim 2, wherein:
   said spring elements have a compliance in bending lying in the range of 100 to 10,000 pounds per inch.

4. Apparatus as described in claims 1 or 2 or 3 wherein:
   said display means is an electro-optical visual display whose mass is solely supported by said spring elements.

5. Apparatus as described in claims 1 or 2 or 3, wherein:
   said spring elements have a stiffness chosen relative to the mass of said display means supported thereby to yield a natural resonant frequency of the assembly in the range of 1 to 100 hz.

6. Apparatus as described in claims 1, 2 or 3, wherein:
   Each of said spring elements is cantilever mounted at at least one end thereof.

7. A touch sensing display apparatus, comprising in combination:
   a display means for visibly manifesting data on a surface thereof; and a frame means; and
   a plurality of spring elements connected to said frame means and to said display means, said spring elements being the sole support for said display means; and
   a plurality of strain sensor means associated with said springs, said plurality of strain sensor means providing electrical output signals in response to strains imposed in said spring elements by relative movement between said display means and said frame means.

8. Apparatus as described in claim 7, wherein:
   said spring elements provide substantially only a single degree of freedom of relative movement between said display means and said frame means along an axis generally perpendicular to the surface of said display means.

9. Apparatus as described in claim 7, wherein:
   said spring elements have a compliance in bending lying in the range of 100 to 10,000 pounds per inch.

10. Apparatus as described in claims 7 or 8 or 9, wherein:
    said display means is an electro-optical visual display whose mass is solely supported by said spring elements.

11. Apparatus as described in claims 7 or 8 or 9, wherein:
    said spring elements have a stiffness chosen relative to the mass of said display means supported thereby to yield a natural resonant frequency of the assembly in the range of 1 to 100 hz.

12. Apparatus as described in claims 7 or 8 or 9, wherein:
    Each of said spring elements is cantilever mounted at at least one end thereof.

* * * * *